United States Patent
Meckl

(10) Patent No.: US 10,447,671 B1
(45) Date of Patent: Oct. 15, 2019

(54) SYSTEMS AND METHODS FOR RECOVERING ENCRYPTED INFORMATION

(71) Applicant: Symantec Corporation, Mountain View, CA (US)

(72) Inventor: Steve Meckl, Ashburn, VA (US)

(73) Assignee: Symantec Corporation, Mountain View, CA (US)

( * ) Notice: Subject to any disclaimer, the term of this patent is extended or adjusted under 35 U.S.C. 154(b) by 169 days.

(21) Appl. No.: 15/472,827

(22) Filed: Mar. 29, 2017

(51) Int. Cl.
*G06F 21/00* (2013.01)
*H04L 29/06* (2006.01)
*G06F 12/14* (2006.01)

(52) U.S. Cl.
CPC ........ *H04L 63/061* (2013.01); *G06F 12/1408* (2013.01); *G06F 2212/1052* (2013.01)

(58) Field of Classification Search
CPC ............... H04L 63/061; G06F 12/1408; G06F 2212/1052
See application file for complete search history.

(56) References Cited

U.S. PATENT DOCUMENTS

| | | | | |
|---|---|---|---|---|
| 5,937,066 | A * | 8/1999 | Gennaro | H04L 9/0841 380/286 |
| 6,307,936 | B1 * | 10/2001 | Ober | G06F 8/60 380/277 |
| 9,514,309 | B1 | 12/2016 | Mann | |
| 2017/0093886 | A1 * | 3/2017 | Ovcharik | G06F 21/563 |
| 2018/0075234 | A1 * | 3/2018 | Boutnaru | G06F 21/554 |
| 2018/0114020 | A1 * | 4/2018 | Hirschberg | G06F 21/566 |

FOREIGN PATENT DOCUMENTS

KR 101859823 B1 * 6/2018

OTHER PUBLICATIONS

MSCAPI_Hook Github Page; https://github.com/smeckl/smeckl-work/tree/master/MSCAPI_Hook; As accessed on Mar. 20, 2017.
Cryptography API: Next Generation; https://msdn.microsoft.com/en-us/library/windows/desktop/aa376210(v=vs.85).aspx; As accessed on Mar. 20, 2017.
Wikipedia—RSA BSAFE; https://en.wikipedia.org/wiki/RSA_BSAFE; As accessed on Mar. 20, 2017.

* cited by examiner

*Primary Examiner* — Kambiz Zand
*Assistant Examiner* — Arezoo Sherkat
(74) *Attorney, Agent, or Firm* — FisherBroyles, LLP

(57) ABSTRACT

The disclosed computer-implemented method for recovering encrypted information may include (i) identifying an untrusted application that uses a known cryptographic function, (ii) hooking the known cryptographic function used by the untrusted application to execute decryption-facilitation code when the untrusted application attempts to encrypt data, where the decryption-facilitation code reduces the difficulty of later decrypting data encrypted by the untrusted application, (iii) detecting encrypted data produced by the untrusted application, and (iv) recovering unencrypted data from the encrypted data produced by the untrusted application using a decryption technique facilitated by having executed the decryption-facilitation code that reduced the difficulty of later decrypting the encrypted data encrypted by the untrusted application. Various other methods, systems, and computer-readable media are also disclosed.

18 Claims, 7 Drawing Sheets

200

SYSTEMS AND METHODS FOR RECOVERING ENCRYPTED INFORMATION

BACKGROUND

The variety of malware on the Internet is ever-growing. One such variant of malware is ransomware, sometimes also known as crypto-ransomware, which attempts to encrypt important files on a user's computing system and then hold the encrypted files for ransom. If the user does not pay the ransom, the important files remain encrypted and may be impossible for the user to access. Unfortunately, the encryption of important files may result in data loss and/or may compromise functionality on the computing system. Breaking the encryption without paying the ransom may be incredibly difficult due to the strength of the encryption algorithms used by the ransomware and the exponential computation requirements required to break modern encryption algorithms, making key recover mathematically infeasible.

Traditional security systems for detecting other types of malware, such as anti-virus applications, often fail to detect ransomware because attackers frequently update their tools to evade such security systems. In many cases, traditional systems may not determine that an application is ransomware until the user's files have already been encrypted. Even if the ransomware is removed, the damage is done and the files remain encrypted. In some cases, ransomware may even encrypt backup files, making it very difficult for a user to recover lost data. The instant disclosure, therefore, identifies and addresses a need for systems and methods for recovering encrypted information.

SUMMARY

As will be described in greater detail below, the instant disclosure describes various systems and methods for recovering encrypted information.

In one example, a computer-implemented method for recovering encrypted information may include (i) identifying an untrusted application that uses a known cryptographic function, (ii) hooking the known cryptographic function used by the untrusted application to execute decryption-facilitation code when the untrusted application attempts to encrypt data, where the decryption-facilitation code reduces the difficulty of later decrypting data encrypted by the untrusted application, (iii) detecting encrypted data produced by the untrusted application, and (iv) recovering unencrypted data from the encrypted data produced by the untrusted application using a decryption technique facilitated by having executed the decryption-facilitation code that reduced the difficulty of later decrypting the encrypted data encrypted by the untrusted application.

In one embodiment, the decryption-facilitation code may reduce the difficulty of later decrypting the encrypted data encrypted by the untrusted application by supplying a key to the untrusted application to use when encrypting the unencrypted data and storing the key for later use in decrypting the encrypted data. In some examples, recovering the unencrypted data from the encrypted data produced by the untrusted application may include decrypting the encrypted data using the key stored by the decryption-facilitation code.

In one embodiment, the decryption-facilitation code may reduce the difficulty of later decrypting the encrypted data encrypted by the untrusted application by reducing a randomness of the known cryptographic function called by the untrusted application. In some examples, recovering the unencrypted data from the encrypted data produced by the untrusted application may include exhaustively searching a reduced key space for a key to decrypt the encrypted data, where the reduced key space is reduced due to the decryption-facilitation code reducing the difficulty of later decrypting data encrypted by the untrusted application.

In one embodiment, the decryption-facilitation code may reduce the difficulty of later decrypting the encrypted data encrypted by the untrusted application by capturing a key used by the untrusted application to encrypt the unencrypted data. In some examples, recovering the unencrypted data from the encrypted data produced by the untrusted application may include decrypting the encrypted data using the key captured by the decryption-facilitation code.

In some examples, identifying the untrusted application may include identifying an application that is not on a whitelist of known trusted applications. In some examples, identifying the untrusted application may include identifying an application that is suspected of being malicious. Additionally or alternatively, identifying the untrusted application that uses the known cryptographic function may include determining that the untrusted application accesses the known cryptographic function via an application programming interface (API).

In one embodiment, the known cryptographic function may include a function in a cryptographic library. In some examples, hooking the known cryptographic function used by the untrusted application to execute the decryption-facilitation code when the untrusted application attempts to encrypt the unencrypted data may include intercepting a call to the known cryptographic function by the untrusted application and redirecting the call by the unknown application to a predetermined alternate cryptographic function.

In one embodiment, identifying the untrusted application that uses the known cryptographic function may include identifying that an unknown application is executing, determining that the unknown application is an untrusted application, and monitoring library access by the untrusted application to determine that the untrusted application accesses the known cryptographic function. In some examples, recovering unencrypted data from the encrypted data produced by the untrusted application may occur in response to determining that the untrusted application is ransomware. In one embodiment, the computer-implemented method may further include determining that the untrusted application is trusted and avoiding hooking the known cryptographic function used by the untrusted application to execute decryption-facilitation code when the untrusted application attempts to encrypt additional data in response to determining that the untrusted application is trusted.

In one embodiment, a system for implementing the above-described method may include (i) an identification module, stored in memory, that identifies an untrusted application that uses a known cryptographic function, (ii) a hook module, stored in memory, that hooks the known cryptographic function used by the untrusted application to execute decryption-facilitation code when the untrusted application attempts to encrypt data, where the decryption-facilitation code reduces the difficulty of later decrypting data encrypted by the untrusted application, (iii) a detection module, stored in memory, that detects encrypted data produced by the untrusted application, (iv) a recovery module, stored in memory, that recovers unencrypted data from the encrypted data produced by the untrusted application using a decryption technique facilitated by having executed the decryption-facilitation code that reduced the difficulty of later decrypting the encrypted data encrypted by the untrusted application, and (v) at least one physical processor configured to execute the identification module, the hook module, the detection module, and the recovery module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an untrusted application that uses a known cryptographic function, (ii) hook the known cryptographic function used by the untrusted application to execute decryption-facilitation code when the untrusted application attempts to encrypt data, where the decryption-facilitation code reduces the difficulty of later decrypting data encrypted by the untrusted application, (iii) detect encrypted data produced by the untrusted application, and (iv) recover unencrypted data from the encrypted data produced by the untrusted application using a decryption technique facilitated by having executed the decryption-facilitation code that reduced the difficulty of later decrypting the encrypted data encrypted by the untrusted application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
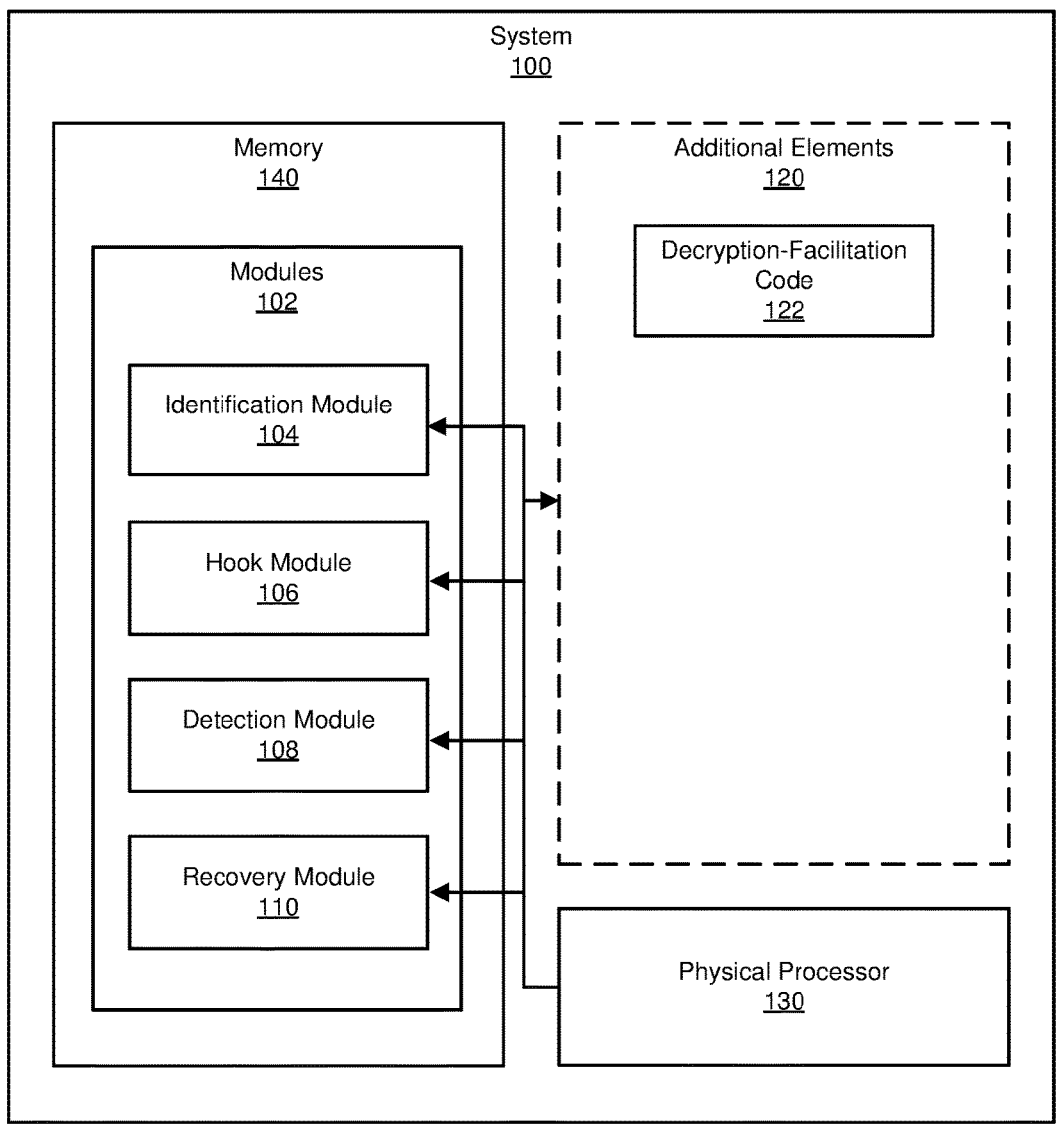
FIG. 1 is a block diagram of an example system for recovering encrypted information.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for recovering encrypted information. As will be explained in greater detail below, by hooking an untrusted application's call to a cryptographic function in order to encrypt the data in a predictable way, the systems and methods described herein may enable a user to easily decrypt data that was encrypted by an untrusted application. By reducing the difficulty of decrypting potentially illegitimately encrypted data, the systems and methods described herein may be able to reduce the harm caused by ransomware, improving the security of a computing device and reducing the risk of a user losing valuable data. In addition, the systems and methods described herein may improve the functioning of a computing device by improving the ease of data recovery after a ransomware attack and thus reducing the computing device's likelihood of suffering from data loss.

Figure 2:
FIG. 2 is a block diagram of an additional example system for recovering encrypted information.
Figure 2:
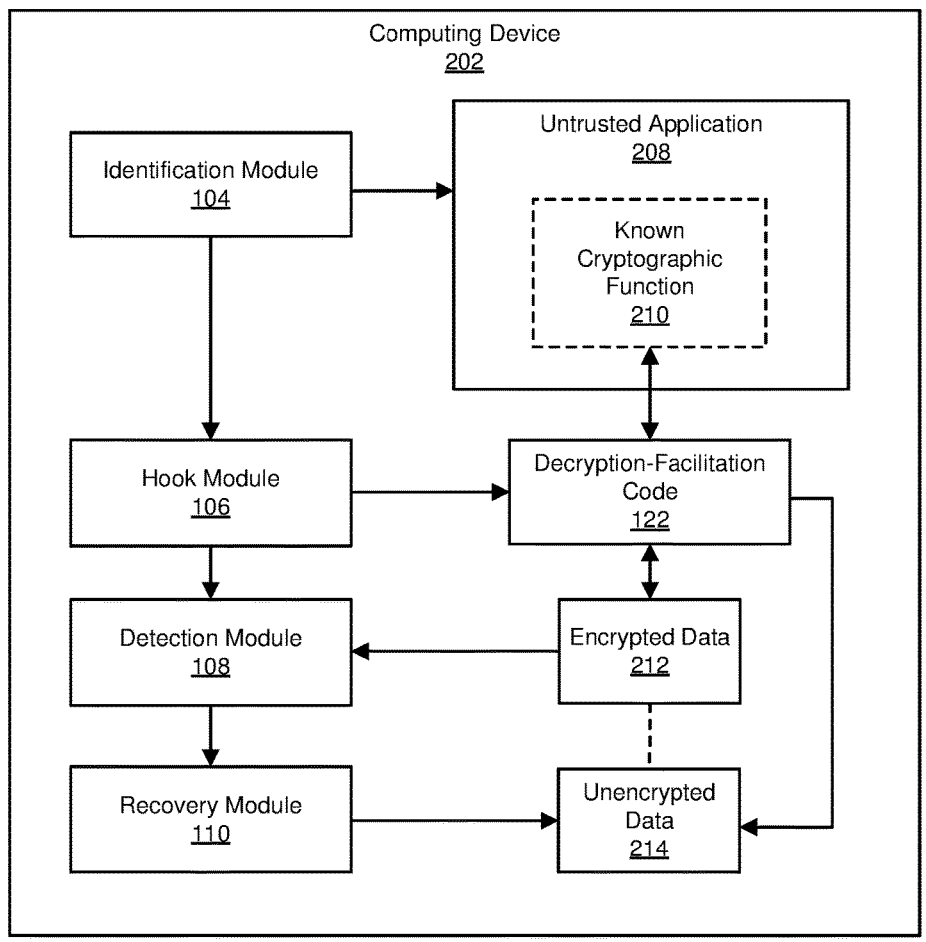
Figure 3:
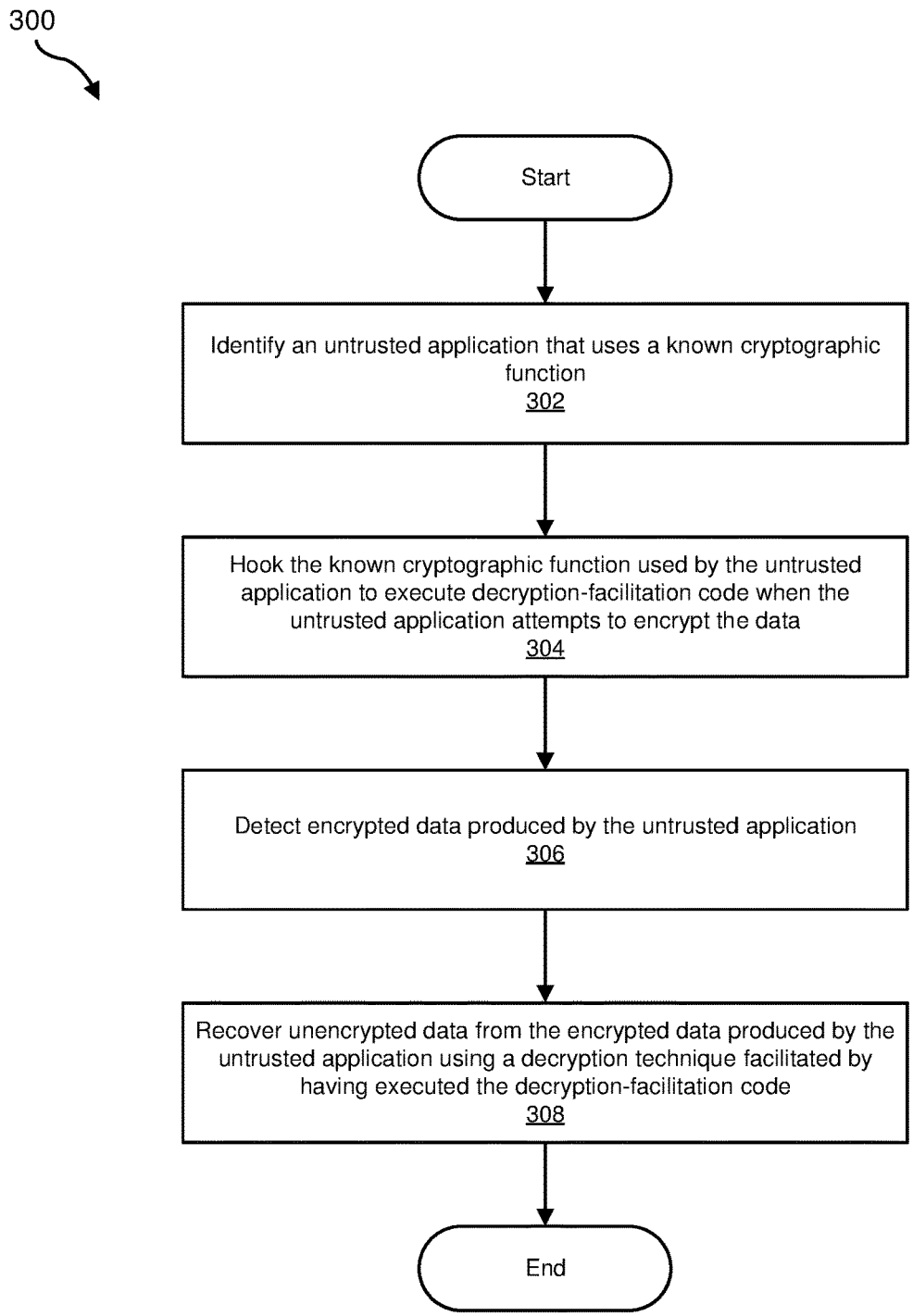
FIG. 3 is a flow diagram of an example method for recovering encrypted information.
Figure 4:
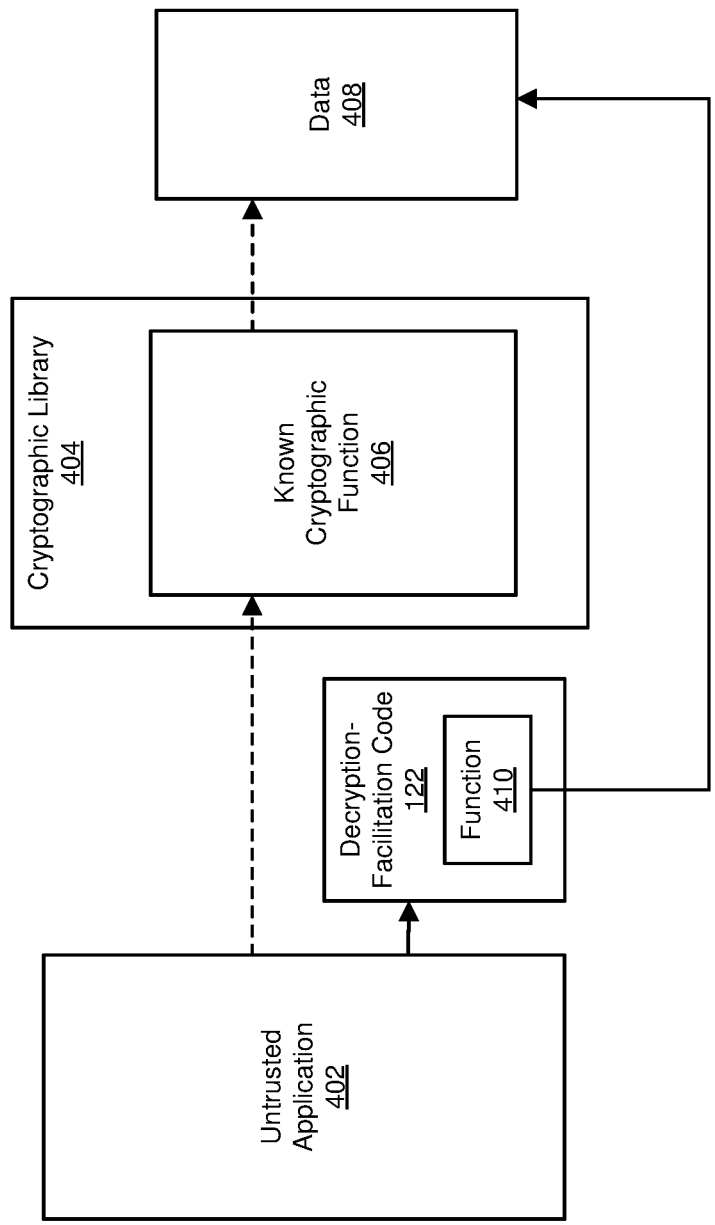
FIG. 4 is a block diagram of an additional example computing system for recovering encrypted information.

The following will provide, with reference to FIGS. 1, 2, and 4, detailed descriptions of example systems for recovering encrypted information. Detailed descriptions of corresponding computer-implemented methods will also be provided in connection with FIGS. 3 and 5. In addition, detailed descriptions of an example computing system and network architecture capable of implementing one or more of the embodiments described herein will be provided in connection with FIGS. 6 and 7, respectively.

FIG. 1 is a block diagram of example system 100 for recovering encrypted information. As illustrated in this figure, example system 100 may include one or more modules 102 for performing one or more tasks. For example, and as will be explained in greater detail below, example system 100 may include an identification module 104 that identifies an untrusted application that uses a known cryptographic function. Example system 100 may additionally include a hook module 106 that hooks the known cryptographic function used by the untrusted application to execute decryption-facilitation code when the untrusted application attempts to encrypt data, where the decryption-facilitation code reduces the difficulty of later decrypting data encrypted by the untrusted application. Example system 100 may also include a detection module 108 that detects encrypted data produced by the untrusted application. Example system 100 may additionally include a recovery module 110 that recovers unencrypted data from the encrypted data produced by the untrusted application using a decryption technique facilitated by having executed the decryption-facilitation code that reduced the difficulty of later decrypting the encrypted data encrypted by the untrusted application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate recovering encrypted information. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as decryption-facilitation code 122. Decryption-facilitation code 122 generally represents any type or form of code, script, application, and/or module that facilitates the decryption of encrypted information.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to recover encrypted information. For example, and as will be described in greater detail below, identification module 104 may identify an untrusted application 208 that uses a known cryptographic function 210. Next, hook module 106 may hook known cryptographic function 210 used by untrusted application 208 to execute decryption-facilitation code 122 when untrusted application 208 attempts to encrypt data, where decryption-facilitation code 122 reduces the difficulty of later decrypting data encrypted by untrusted application 208. At some point in time, detection module 108 may detect encrypted data 212 produced by untrusted application 208. After encrypted data 212 has been detected, recovery module 110 may recover unencrypted data 214 from encrypted data 212 produced by untrusted application 208 using a decryption technique facilitated by having executed decryption-facilitation code 122 that reduced the difficulty of later decrypting encrypted data 212.

Computing device 202 generally represents any type or form of computing device capable of reading computer-executable instructions. In one embodiment, computing device 202 may be an end user computing device, such as a personal computer. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Untrusted application 208 generally represents any type or form of script, process, application, program, and/or executable file. Known cryptographic function 210 generally represents any code that is capable of generating cryptographic keys and/or encrypting data. Encrypted data 212 generally represents any type of data that has been subject to cryptographic encryption. Unencrypted data 214 generally represents any data that was previously encrypted and has now been restored to an unencrypted state.

FIG. 3 is a flow diagram of an example computer-implemented method 300 for recovering encrypted information. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an untrusted application that uses a known cryptographic function. For example, identification module 104 may, as part of computing device 202 in FIG. 2, identify untrusted application 208 that uses known cryptographic function 210.

The term "untrusted application," as used herein, generally refers to any application, code, script, module, program, executable file, and/or library that has not been verified as trusted. In some examples, an untrusted application may be a newly installed application that has not yet been analyzed by and/or has not been classified as safe by one or more security applications. In some examples, an untrusted application may be any application that is not on a whitelist of trusted applications. In one example, an untrusted application may have a reputation score below a certain threshold. In some examples, an untrusted application may include an application that has not been digitally signed by a trusted authority.

The term "known cryptographic function," as used herein, generally refers to any function, subroutine, module, application, script, program, and/or code that receives data and returns a transformed version of the data. In some embodiments, a known cryptographic function may convert plain text data into encrypted data that requires a key to be transformed back into plain text data. In one embodiment, the known cryptographic function may be a function in a cryptographic library. For example, the known cryptographic function may be in a library such as MICROSOFT'S CRYPTOGRAPHY NEXT GENERATION API and/or RSA's BSAFE. In some embodiments, the known cryptographic function may be in a list of known cryptographic functions that identification module 104 checks for. Additionally or alternatively, the known cryptographic function may be in a library that is on a list of known cryptographic libraries that identification module 104 checks for.

Identification module 104 may identify the untrusted application that uses the known cryptographic function in a variety of ways and/or contexts. In some examples, identification module 104 may identify the untrusted application by identifying an application that is not on a whitelist of known trusted applications. Additionally or alternatively, identification module 104 may identify the untrusted application by identifying an application that is suspected of being malicious. For example, identification module 104 may receive information from a security and/or anti-malware application that suggests that the untrusted application is potentially malicious. In another example, identification module 104 may determine that the application is on a list of untrusted applications. In some embodiments, identification module 104 may identify the untrusted application that uses the known cryptographic function by receiving information from a kernel driver that monitors the loading of cryptographic libraries into memory by applications.

In some examples, identification module 104 may identify the untrusted application that uses the known cryptographic function by determining that the untrusted application accesses the known cryptographic function via an API. For example, identification module 104 may monitor API calls by the untrusted application to determine whether the untrusted application makes API calls to the known cryptographic function.

In one embodiment, identification module 104 may identify the untrusted application that uses the known cryptographic function by identifying that an unknown application is executing, determining that the unknown application is an untrusted application, and monitoring library access by the untrusted application to determine that the untrusted application accesses the known cryptographic function. For example, identification module 104 may monitor the untrusted application to determine whether the untrusted application loads into memory any dynamic linked libraries, static libraries, and/or shared objects that include the known cryptographic function.

At step 304, one or more of the systems described herein may hook the known cryptographic function used by the untrusted application to execute decryption-facilitation code when the untrusted application attempts to encrypt data, where the decryption-facilitation code reduces the difficulty of later decrypting data encrypted by the untrusted application. For example, hook module 106 may, as part of computing device 202 in FIG. 2, hook known cryptographic function 210 used by untrusted application 208 to execute decryption-facilitation code 122 when untrusted application 208 attempts to encrypt data, where decryption-facilitation code 122 reduces the difficulty of later decrypting data encrypted by untrusted application 208.

The term "decryption-facilitation code," as used herein, generally refers to any code that participates in the encryption of data such that the decryption-facilitation code can later decrypt that data with relative ease compared to a scenario where the decryption-facilitation code had not participated in encrypting the data. In some examples, decryption-facilitation code may participate in the encryption of data by providing a key to be used to encrypt the data. In other examples, decryption-facilitation code may participate in the encryption of data by observing and storing the key used to encrypt the data. Additionally or alternatively, decryption-facilitation code may participate in the encryption of data by replacing some or all of the random bits in a sequence of random bits used as an encryption key with known bits.

The term "data," as used herein, generally refers to any file or files of any type. In some examples, data may include document files. In some examples, data may include executable files, library files, and/or operating system files. Additionally or alternatively, data may include archive and/or backup files.

Hook module 106 may hook the known cryptographic function in a variety of ways. For example, hook module 106 may intercept a call made to the known cryptographic function by the untrusted application at run time. In another embodiment, hook module 106 may hook the known cryptographic function by altering a library or other file in which the known cryptographic function resides to modify or replace the known cryptographic function with the decryption-facilitation code. Additionally or alternatively, hook module 106 may alter the import table used by the untrusted application to call the known cryptographic file, replacing the address of the known cryptographic function with the address of a modified version of the known cryptographic function that executes the decryption-facilitation code.

In one embodiment, the decryption-facilitation code may reduce the difficulty of later decrypting the encrypted data encrypted by the untrusted application by supplying a key and/or key pair to the untrusted application to use when encrypting the unencrypted data and storing the key and/or key pair for later use in decrypting the encrypted data. For example, if the known cryptographic function includes the BCryptDeriveKey( ) function, the decryption-facilitation code may supply the function with a known key. In some examples, the known key may be predetermined. In other examples, the known key may be randomly generated and then stored.

In one embodiment, the decryption-facilitation code may reduce the difficulty of later decrypting the encrypted data encrypted by the untrusted application by reducing a randomness of the known cryptographic function called by the untrusted application. For example, if the known cryptographic function includes the BCryptGenRandom( ) function, the decryption-facilitation code may replace some bits of the key generated by the function with known bits. For example, the decryption-facilitation code may replace a portion of the bits with repeated zeroes.

In one embodiment, the decryption-facilitation code may reduce the difficulty of later decrypting the encrypted data encrypted by the untrusted application by capturing a key used by the untrusted application to encrypt the unencrypted data. In some embodiments, the decryption-facilitation code may capture the key without otherwise affecting the generation of the key. In one example, the decryption-facilitation code may observe the key generated by the known cryptographic function and may record the key in a secure key store for later use. In some embodiments, the secure key store may be secured to prevent malicious applications from accessing the captured keys in the key store. For example, if the decryption-facilitation code captures a key from an untrusted application that is actually a benign application, the systems described herein may secure the captured key to prevent attackers from using the key to decrypt data that was legitimately encrypted by the benign application.

In some examples, hook module 106 may hook the known cryptographic function used by the untrusted application to execute the decryption-facilitation code when the untrusted application attempts to encrypt the unencrypted data by intercepting a call to the known cryptographic function by the untrusted application and redirecting the call by the untrusted application to a predetermined alternate cryptographic function. For example, as illustrated in FIG. 4, an untrusted application 402 may make a call to a known cryptographic function 406 in a cryptographic library 404 in order to encrypt data 408. In this example, decryption-facilitation code 122 may intercept the call from untrusted application 402 to known cryptographic function 406 and may redirect the function call to function 410, which may be a cryptographic function that stores keys, produces less secure keys, and/or otherwise encrypts data 408 in a way that enables decryption-facilitation code 122 to more easily decrypt data 408.

Returning to FIG. 3, at step 306, one or more of the systems described herein may detect encrypted data produced by the untrusted application. For example, detection module 108 may, as part of computing device 202 in FIG. 2, detect encrypted data 212 produced by untrusted application 208.

Detection module 108 may detect the encrypted data in a variety of contexts. For example, detection module 108 may monitor the untrusted application and may detect the encrypted data as soon as the untrusted application has encrypted the data. In other examples, detection module 108 may detect the encrypted data once a user has prompted detection module 108 to detect data encrypted by the untrusted application. For example, if the untrusted application is ransomware, a user may become aware that some of their files have been illegitimately encrypted and may prompt detection module 108 to identify all of the files illegitimately encrypted by the ransomware. In some examples, detection module 108 may scan the computing device to detect all instances of data encrypted by the untrusted application.

At step 308, one or more of the systems described herein may recover unencrypted data from the encrypted data produced by the untrusted application using a decryption technique facilitated by having executed the decryption-facilitation code that reduced the difficulty of later decrypting the encrypted data encrypted by the untrusted application. For example, recovery module 110 may, as part of computing device 202 in FIG. 2, recover unencrypted data 214 from encrypted data 212 produced by untrusted application 208 using a decryption technique facilitated by having executed decryption-facilitation code 122 that reduced the difficulty of later decrypting encrypted data 212 encrypted by untrusted application 208.

The term "decryption technique," as used herein, generally refers to any method of turning encrypted or cipher data into unencrypted or plain text data. In some embodiments, a decryption technique may require knowledge of the key used to encrypt the data in order to decrypt the data. In some examples, a decryption technique may not require knowledge of the key but may instead exhaustively search a defined key space for the key.

Recovery module 110 may recover the unencrypted data from the encrypted data in a variety of ways. For example, recovery module 110 may recover the unencrypted data from the encrypted data produced by the untrusted application by decrypting the encrypted data using a key stored by the decryption-facilitation code. In some examples, recovery module 110 may recover the unencrypted data from the encrypted data produced by the untrusted application by decrypting the encrypted data using the key captured by the decryption-facilitation code when the untrusted application encrypted the data. In some embodiments, recovery module 110 may recover the unencrypted data by deriving an encryption key from a predetermined password provided to the untrusted application by the decryption-facilitation code.

In some embodiments, recovery module 110 may recover the unencrypted data from the encrypted data produced by the untrusted application by exhaustively searching a reduced key space for a key to decrypt the encrypted data. In some examples, the decryption-facilitation code may have reduced the key space for the key by reducing the randomness of the key. In one example, the decryption-facilitation code may have reduced the key space for the key by replacing some bits on the key with known bits. For example, if the key is 128 bits long, the decryption-facilitation code may replace 120 of those bits with zeroes and/or other known bits. In this example, recovery module 110 now only has eight bits of space to exhaustively search for the key, a much less computationally intensive process than searching a key space of 128 bits. The term "exhaustively search," as used herein, generally refers to trying every possible combination of bits until the correct combination is arrived at. For example, exhaustively searching a key space of two bits may involve trying the combinations "00," "01," "10," and "11." In this example, if the correct key is "10," the exhaustive search may stop without reaching "11." In some examples, it may be mathematically infeasible to exhaustively search the original key space and may be mathematically feasible to search the reduced key space.

Figure 5:
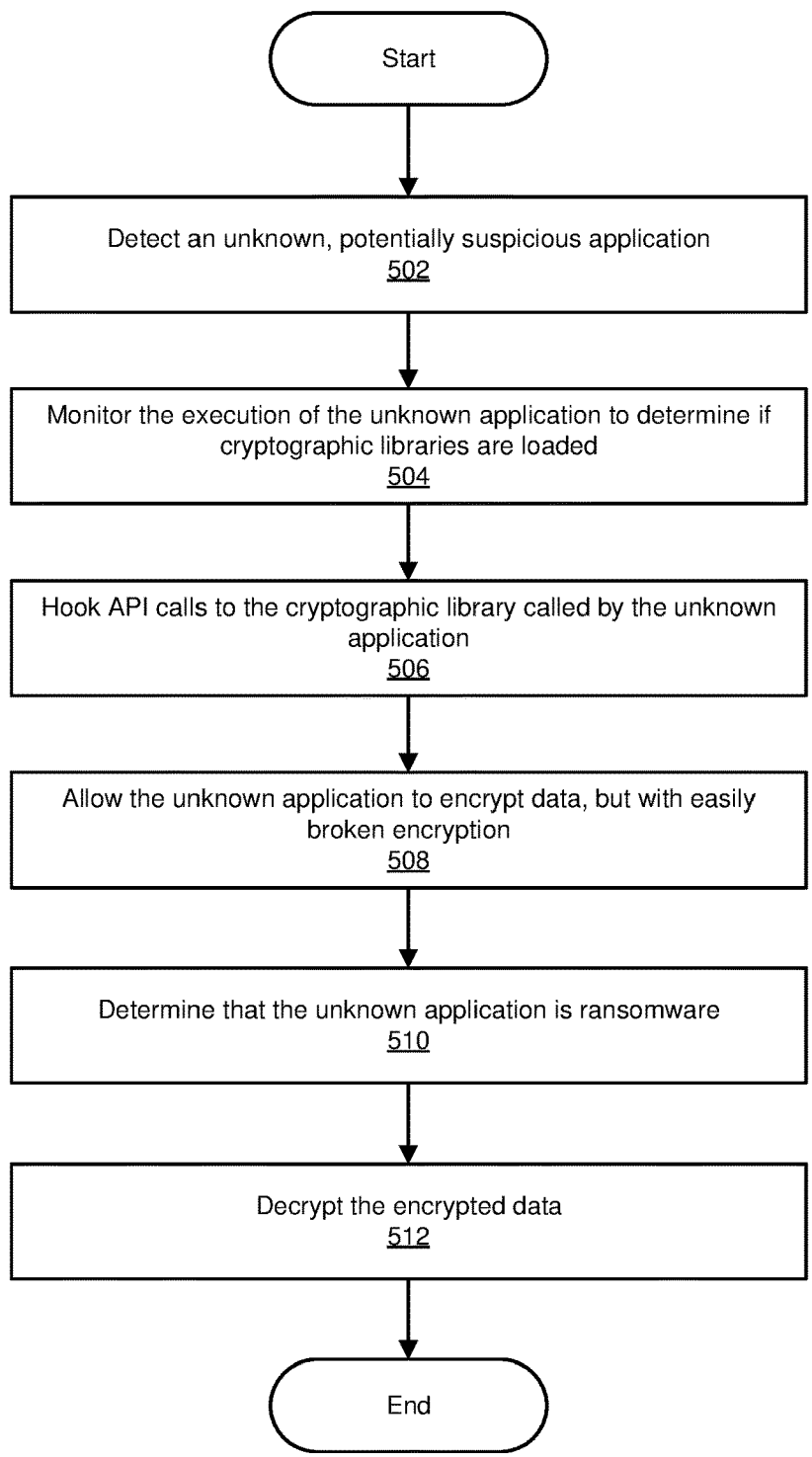
FIG. 5 is a flow diagram of an additional example method for recovering encrypted information.

In some examples, recovery module 110 may recover unencrypted data from the encrypted data produced by the untrusted application in response to determining that the untrusted application is ransomware. For example, as illustrated in FIG. 5, at step 502, the systems described herein may detect an unknown, potentially suspicious application. In some examples, the potentially suspicious application may be flagged as potential malware. In other examples, the potentially suspicious application may not be on a whitelist of known trusted applications. At step 504, the systems described herein may monitor the execution of the unknown application to determine if the unknown application loads cryptographic libraries into memory. If the unknown application does not load any known cryptographic libraries, the systems described herein may stop monitoring the application. If the unknown application does load one or more known cryptographic libraries, at step 506, the systems described herein may hook API calls made to the cryptographic library by the unknown application. At step 508, the systems described herein may detect that the unknown application is attempting to encrypt data and may allow the unknown application to encrypt data, but with encryption that is easily broken by the systems described herein. For example, the systems described herein may capture an encryption key used by the unknown application, supply the unknown application with an encryption key, and/or reduce the randomness of the encryption key used by the unknown application. At step 510, the systems described herein may determine that the unknown application is ransomware. In some examples, a user may discover encrypted files and then alert the systems described herein that the unknown application is ransomware. In other examples, a security application may determine that the unknown application is ransomware and may alert the systems described herein. At step 512, the systems described herein may decrypt the data encrypted by the ransomware, enabling the user to recover their data without being forced to provide payment to the ransomware developers or restore data from an earlier point.

In one embodiment, the systems described herein may determine that the untrusted application is trusted and may avoid hooking the known cryptographic function used by the untrusted application to execute decryption-facilitation code when the untrusted application attempts to encrypt additional data in response to determining that the untrusted application is trusted. For example, the systems described herein may initially identify an untrusted application that is not on a whitelist of known trusted applications. In one example, this untrusted application may be a new instant messaging application installed by the user. In this example, the user may manually flag the instant messaging application as trusted and the systems described herein may stop monitoring and/or hooking function calls by the application in response to the user flagging the application as trusted. In another example, a security system may perform an analysis of the untrusted application and may inform the systems described herein that the application is trusted. In this example, the systems described herein may stop monitoring and/or hooking function calls made by the application in response to the security system indicating that the application is trusted. In one example, systems described herein may hook and/or allow to remain hooked cryptographic functions for both trusted and untrusted applications but may only communicate with the hooked trusted applications to trigger execution of the decryption-facilitation code to weaken and/or undermine the encryption used by the untrusted applications.

As explained in connection with method 300 above, the systems and methods described herein may use user-mode API hooking and/or kernel-mode system call hooking to manipulate the key generation functions of cryptographic APIs for untrusted applications so that random encryption keys created by crypto-ransomware can be captured and stored, manipulated to reduce the size of the random key space, and/or blocked outright. The systems and methods described herein may allow for information about the algorithms used, initialization vectors, and/or other encryption algorithm configuration information to be captured and stored, allowing for data encrypted by crypto-ransomware to be easily recovered by victims. In some embodiments, the systems and methods described herein may be part of an endpoint protection application that protects users against malware such as ransomware by enabling users to recover data encrypted by ransomware.

Figure 6:
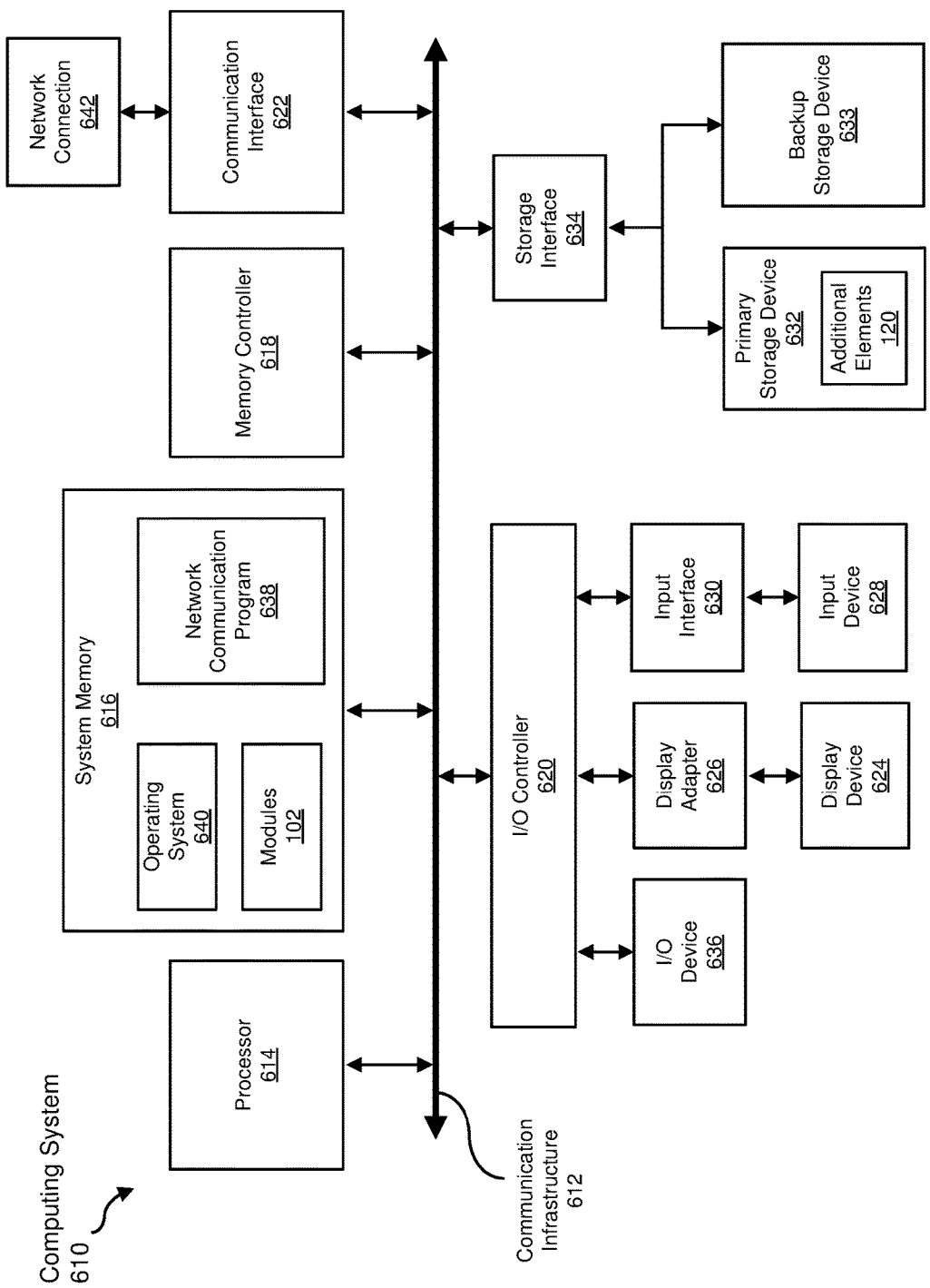
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
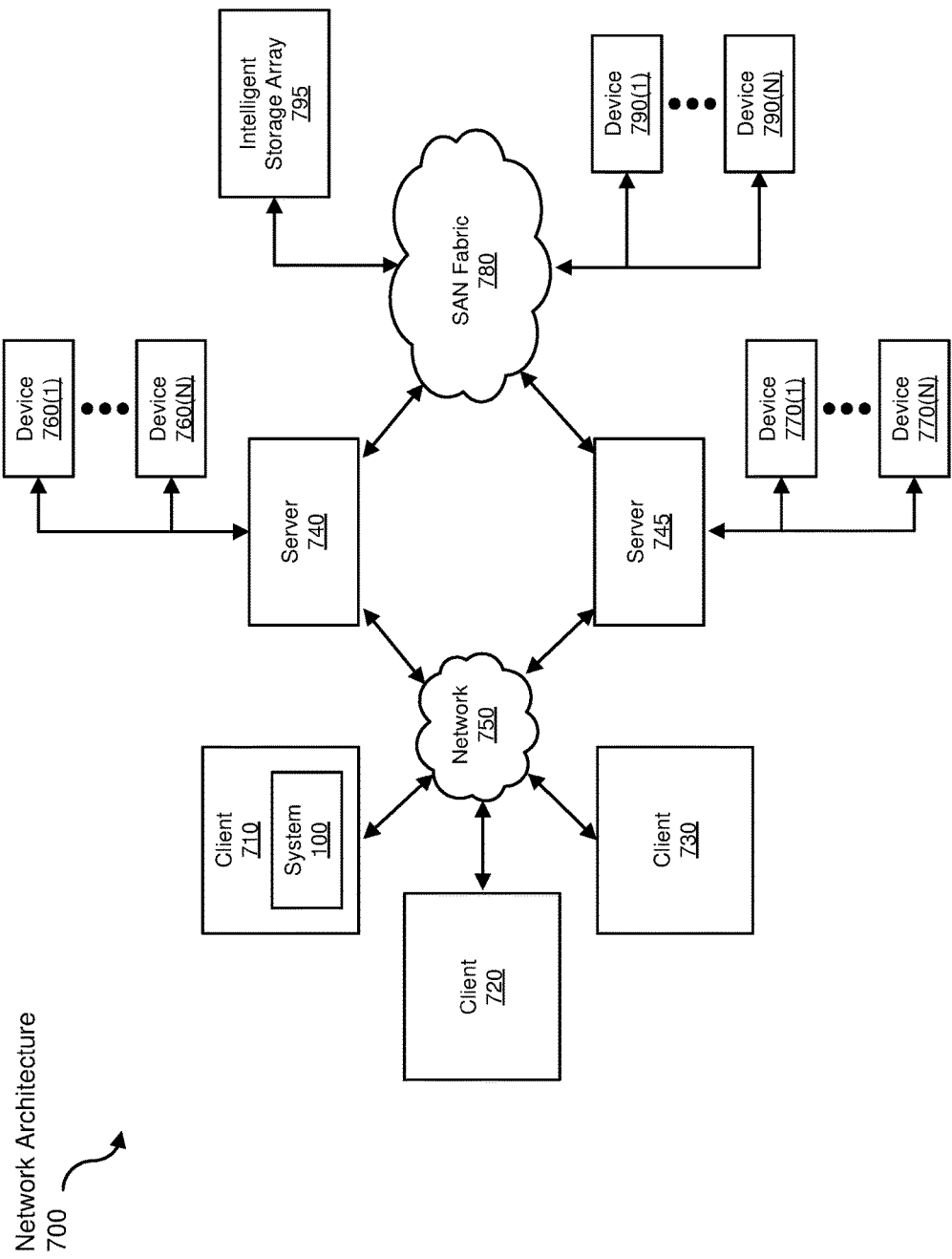
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for recovering encrypted information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive encrypted data to be transformed, transform the encrypted data by decrypting the data, output a result of the transformation to a data storage location, use the result of the transformation to restore encrypted data, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for recovering encrypted information, at least a portion of the method being performed by a computing device comprising at least one processor, the method comprising:

identifying an untrusted application that uses a known cryptographic function;

hooking the known cryptographic function used by the untrusted application to execute decryption-facilitation code when the untrusted application attempts to encrypt data, wherein the decryption-facilitation code reduces a difficulty of later decrypting data encrypted by the untrusted application, wherein hooking the known cryptographic function used by the untrusted application to execute the decryption-facilitation code when the untrusted application attempts to encrypt the unencrypted data comprises:

intercepting a call to the known cryptographic function by the untrusted application; and redirecting the call to the known cryptographic function by the untrusted application to a predetermined alternate cryptographic function;

detecting encrypted data produced by the untrusted application;

reducing a randomness of a key; and recovering unencrypted data from the encrypted data produced by the untrusted application using a decryption technique based at least in part on the key and facilitated by having executed the decryption-facilitation code that reduced the difficulty of later decrypting the encrypted data encrypted by the untrusted application, the recovering of the unencrypted data from the encrypted data produced by the untrusted application further comprises:

exhaustively searching a reduced key space for the key to decrypt the encrypted data, wherein the reduced key space is reduced due to the decryption-facilitation code reducing the difficulty of later decrypting data encrypted by the untrusted application.

2. The computer-implemented method of claim 1, wherein the decryption-facilitation code reduces the difficulty of later decrypting the encrypted data encrypted by the untrusted application by:

supplying the key to the untrusted application to use when encrypting the unencrypted data; and storing the key for later use in decrypting the encrypted data.

3. The computer-implemented method of claim 2, wherein recovering the unencrypted data from the encrypted data produced by the untrusted application comprises decrypting the encrypted data using the key stored by the decryption-facilitation code.

4. The computer-implemented method of claim 1, wherein the decryption-facilitation code reduces the difficulty of later decrypting the encrypted data encrypted by the untrusted application by reducing a randomness of the known cryptographic function called by the untrusted application.

5. The computer-implemented method of claim 1, wherein the decryption-facilitation code reduces the difficulty of later decrypting the encrypted data encrypted by the untrusted application by capturing the key used by the untrusted application to encrypt the unencrypted data.

6. The computer-implemented method of claim 5, wherein recovering the unencrypted data from the encrypted data produced by the untrusted application comprises decrypting the encrypted data using the key captured by the decryption-facilitation code.

7. The computer-implemented method of claim 1, wherein identifying the untrusted application comprises identifying an application that is not on a whitelist of known trusted applications.

8. The computer-implemented method of claim 1, wherein identifying the untrusted application comprises identifying an application that is suspected of being malicious.

9. The computer-implemented method of claim 1, wherein identifying the untrusted application that uses the known cryptographic function comprises determining that the untrusted application accesses the known cryptographic function via an application programming interface.

10. The computer-implemented method of claim 1, wherein the known cryptographic function comprises a function in a cryptographic library.

11. The computer-implemented method of claim 1, wherein recovering unencrypted data from the encrypted data produced by the untrusted application is in response to determining that the untrusted application comprises ransomware.

12. The computer-implemented method of claim 1, wherein identifying the untrusted application that uses the known cryptographic function comprises:

identifying that an unknown application is executing;

determining that the unknown application comprises the untrusted application; and monitoring library access by the untrusted application to determine that the untrusted application accesses the known cryptographic function.

13. The computer-implemented method of claim 1, further comprising:

determining that the untrusted application is trusted; and avoiding hooking the known cryptographic function used by the untrusted application to execute decryption-facilitation code when the untrusted application attempts to encrypt additional data in response to determining that the untrusted application is trusted.

14. A system for recovering encrypted information, the system comprising:

an identification module, stored in memory, that identifies an untrusted application that uses a known cryptographic function;

a hook module, stored in memory, that hooks the known cryptographic function used by the untrusted application to execute decryption-facilitation code when the untrusted application attempts to encrypt data, wherein the decryption-facilitation code reduces a difficulty of later decrypting data encrypted by the untrusted application, wherein hooking the known cryptographic function used by the untrusted application to execute the decryption-facilitation code when the untrusted application attempts to encrypt the unencrypted data comprises:

intercepting a call to the known cryptographic function by the untrusted application; and redirecting the call to the known cryptographic function by the untrusted application to a predetermined alternate cryptographic function;

a detection module, stored in memory, that detects encrypted data produced by the untrusted application;

a reducing module, stored in memory that reduces a randomness of a key;

a recovery module, stored in memory, that recovers unencrypted data from the encrypted data produced by the untrusted application using a decryption technique based at least in part on the key and facilitated by having executed the decryption-facilitation code that reduced the difficulty of later decrypting the encrypted data encrypted by the untrusted application, the recovering of the unencrypted data from the encrypted data produced by the untrusted application further comprises:

exhaustively searching a reduced key space for the key to decrypt the encrypted data, wherein the reduced key space is reduced due to the decryption-facilitation code reducing the difficulty of later decrypting data encrypted by the untrusted application; and at least one physical processor configured to execute the identification module, the hook module, the detection module, the reducing module, and the recovery module.

15. The system of claim 14, wherein the decryption-facilitation code reduces the difficulty of later decrypting the encrypted data encrypted by the untrusted application by:

supplying the key to the untrusted application to use when encrypting the unencrypted data; and storing the key for later use in decrypting the encrypted data.

16. The system of claim 15, wherein the recovery module recovers the unencrypted data from the encrypted data produced by the untrusted application by decrypting the encrypted data using the key stored by the decryption-facilitation code.

17. The system of claim 14, wherein the decryption-facilitation code reduces the difficulty of later decrypting the encrypted data encrypted by the untrusted application by reducing a randomness of the known cryptographic function called by the untrusted application.

18. A non-transitory computer-readable medium comprising one or more computer-readable instructions that, when executed by at least one processor of a computing device, cause the computing device to:

identify an untrusted application that uses a known cryptographic function;

hook the known cryptographic function used by the untrusted application to execute decryption-facilitation code when the untrusted application attempts to encrypt data, wherein the decryption-facilitation code reduces a difficulty of later decrypting data encrypted by the untrusted application, wherein hooking the known cryptographic function used by the untrusted application to execute the decryption-facilitation code when the untrusted application attempts to encrypt the unencrypted data comprises:

intercepting a call to the known cryptographic function by the untrusted application; and redirecting the call to the known cryptographic function by the untrusted application to a predetermined alternate cryptographic function;

detect encrypted data produced by the untrusted application;

reduce a randomness of a key; and recover unencrypted data from the encrypted data produced by the untrusted application using a decryption technique based at least in part on the key and facilitated by having executed the decryption-facilitation code that reduced the difficulty of later decrypting the encrypted data encrypted by the untrusted application, the recovering of the unencrypted data from the encrypted data produced by the untrusted application further comprises:

exhaustively searching a reduced key space for the key to decrypt the encrypted data, wherein the reduced key space is reduced due to the decryption-facilitation code reducing the difficulty of later decrypting data encrypted by the untrusted application.

\* \* \* \* \*